US012609577B2

(12) United States Patent
Yasuda

(10) Patent No.: US 12,609,577 B2
(45) Date of Patent: Apr. 21, 2026

(54) ELECTRIC MOTOR

(71) Applicant: FANUC CORPORATION, Yamanashi (JP)

(72) Inventor: Ryuya Yasuda, Yamanashi-ken (JP)

(73) Assignee: FANUC CORPORATION, Yamanashi (JP)

( * ) Notice: Subject to any disclaimer, the term of this patent is extended or adjusted under 35 U.S.C. 154(b) by 210 days.

(21) Appl. No.: 18/560,416

(22) PCT Filed: Feb. 16, 2022

(86) PCT No.: PCT/JP2022/006073
§ 371 (c)(1),
(2) Date: Nov. 13, 2023

(87) PCT Pub. No.: WO2022/244349
PCT Pub. Date: Nov. 24, 2022

(65) Prior Publication Data
US 2024/0250574 A1 Jul. 25, 2024

(30) Foreign Application Priority Data

May 20, 2021 (WO) .................. PCT/JP2021/019206

(51) Int. Cl.
*H02K 5/10* (2006.01)
*H02K 1/18* (2006.01)
(52) U.S. Cl.
CPC ................. *H02K 5/10* (2013.01); *H02K 1/18* (2013.01)
(58) Field of Classification Search
CPC . Y02A 50/20; H02K 1/18; H02K 5/10; H02K 5/15
See application file for complete search history.

(56) References Cited

U.S. PATENT DOCUMENTS 6,755,009 B1 * 6/2004 Earnhart ................ G03C 3/003
53/284.4
2021/0099056 A1 * 4/2021 Fukuda .................. H02K 1/185

FOREIGN PATENT DOCUMENTS

CN 206807204 U 12/2017
JP H02022042 U 2/1990
JP H09149582 A 6/1997
JP H10118857 A 5/1998
(Continued)

OTHER PUBLICATIONS

International Search Report issued by the Japan Patent Office acting as the International Searching Authority in relation to International Application No. PCT/JP2022/006073 dated May 10, 2022 (3 pages) along with English language translation (2 pages).
(Continued)

*Primary Examiner* — Naishadh N Desai
(74) *Attorney, Agent, or Firm* — CARTER, DELUCA & FARRELL LLP

(57) ABSTRACT

An electric motor that includes a stator core with an exposed outer surface has a housing that is connected to both end faces of the stator core and covers both end faces; and a gasket between the stator core and the housing. The gasket has a plurality of through-holes through which pass a plurality of coupling members that couple the stator core and the housing together; and a ring-shaped bead formed outside the plurality of through-holes with respect to the radial direction of the rotor core.

5 Claims, 8 Drawing Sheets

(56)                References Cited

FOREIGN PATENT DOCUMENTS

| | | | |
|---|---|---|---|
| JP | 2002005291 | A | 1/2002 |
| JP | 2002295648 | A | 10/2002 |
| JP | 2008167609 | A | 7/2008 |
| JP | 2010074990 | A | 4/2010 |
| JP | 2013076352 | A | 4/2013 |
| JP | 2013207815 | A | 10/2013 |
| JP | 2014231868 | A | 12/2014 |
| JP | 2016032332 | A | 3/2016 |
| JP | 2016142387 | A | 8/2016 |
| JP | 2018055763 | A | 4/2018 |
| JP | 2021057975 | A | 4/2021 |

OTHER PUBLICATIONS

Written Opinion of the International Searching Authority issued by the Japan Patent Office acting as the International Searching Authority in relation to International Application No. PCT/JP2022/006073 dated May 10, 2022 (3 pages).

* cited by examiner

D2 ←——— ——→ D1

D1 ⊙    ⊗ D2

ELECTRIC MOTOR

CROSS-REFERENCE TO RELATED APPLICATIONS

This application is a national phase entry under 35 U.S.C. 371 of PCT International Application No. PCT/JP2022/006073, filed Feb. 16, 2022, which claims priority to PCT International Application No. PCT/JP2021/019206, filed May 20, 2021, the disclosure of each of these applications is expressly incorporated herein by reference in their entirety.

TECHNICAL FIELD

The present invention relates to an electric motor in which an outer surface of a stator core is exposed.

BACKGROUND ART

The electric motor disclosed in JP H09-149582 A includes a stator core, housings, and gaskets. The stator core has opposite end surfaces in an axial direction of the electric motor. Each of the opposite end surfaces is connected to the housing via the gasket.

SUMMARY OF THE INVENTION

Each of the stator core, the housing, and the gasket has a hole extending therethrough in the axial direction. The holes of the stator core, the housing, and the gasket communicate with each other in the axial direction. A connecting member is inserted into the plurality of holes communicating with each other. Thus, the stator core, the housing, and the gasket are connected to each other.

Foreign material may enter the hole of the stator core from between the stator core and the gasket or between the housing and the gasket. The stator core has a structure in which a plurality of electromagnetic steel sheets are stacked. There is a problem in that foreign material that has entered the hole of the stator core passes through a gap between the electromagnetic steel sheets and enters the inside of the electric motor in which the rotor core and the like are disposed.

The present invention has the object of solving the aforementioned problems.

According to an aspect of the present invention, there is provided an electric motor equipped with: a rotor core; and a stator core covering an outer periphery of the rotor core and including opposite end surfaces in an axial direction of the rotor core, wherein an outer surface of the stator core is exposed, the electric motor including: a housing connected to the opposite end surfaces of the stator core and covering the opposite end surfaces; and a gasket having an annular shape and provided between the stator core and the housing, wherein the stator core includes a plurality of insertion holes into which a plurality of connecting members configured to connect the housing are inserted, the insertion holes being formed along a circumferential direction of the rotor core, and the gasket includes: a plurality of through holes through which the plurality of connecting members penetrate; and a bead having an annular shape and configured to seal a gap between the stator core and the housing, the bead being formed on an outer side relative to the plurality of through holes in a radial direction of the rotor core.

According to the present invention, foreign material is prevented from entering the inside of the electric motor through a gap between the stator core, the housing, etc. and the gasket.

DETAILED DESCRIPTION OF THE INVENTION

Embodiment

Figure 1:
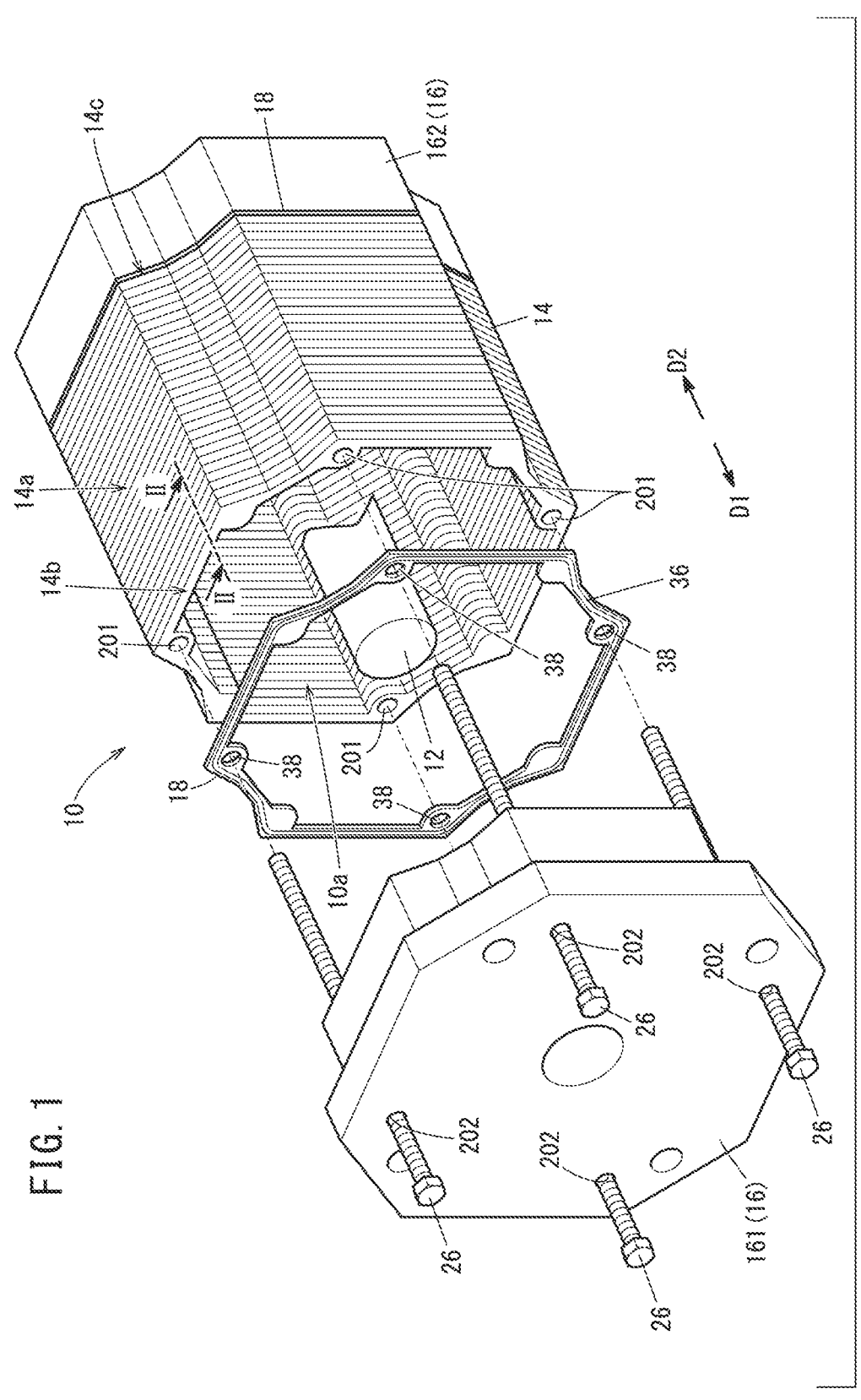
FIG. 1 is an exploded perspective view of an electric motor according to an embodiment.

FIG. 1 is an exploded perspective view of an electric motor 10 according to an embodiment.

An arrow D1 in FIG. 1 indicates a first direction used in the following description (the same applies to the other drawings). An arrow D2 in FIG. 1 indicates a second direction used in the following description (the same applies to the other drawings). The first direction and the second direction are opposite to each other.

The electric motor 10 includes a rotor core 12, a stator core 14, two housings 16, and two gaskets 18. An outer surface (outer circumferential surface) 14a of the stator core 14 is exposed.

The axial direction of the rotor core 12 is a first direction (second direction). The rotor core 12 is covered by the stator core 14, the two housings 16, and the two gaskets 18. That is, the rotor core 12 is accommodated in an inside 10a of the electric motor 10. In FIG. 1, illustration of the rotor core 12 is partially omitted.

The stator core 14 has an annular cross section and has a tubular shape. The stator core 14 has an end surface (first end surface) 14b on the first direction side and a plurality of insertion holes 201. The plurality of insertion holes 201 extend in the axial direction from the first end surface 14b.

The stator core 14 further includes an end surface (second end surface) 14c on the second direction side. A plurality of insertion holes 201 are also formed in the second end surface 14c. However, the plurality of insertion holes 201 of the second end surface 14c may be formed to be symmetrical to the plurality of insertion holes 201 of the first end surface 14b. In view of this, the second end surface 14c is not shown.

Figure 2:
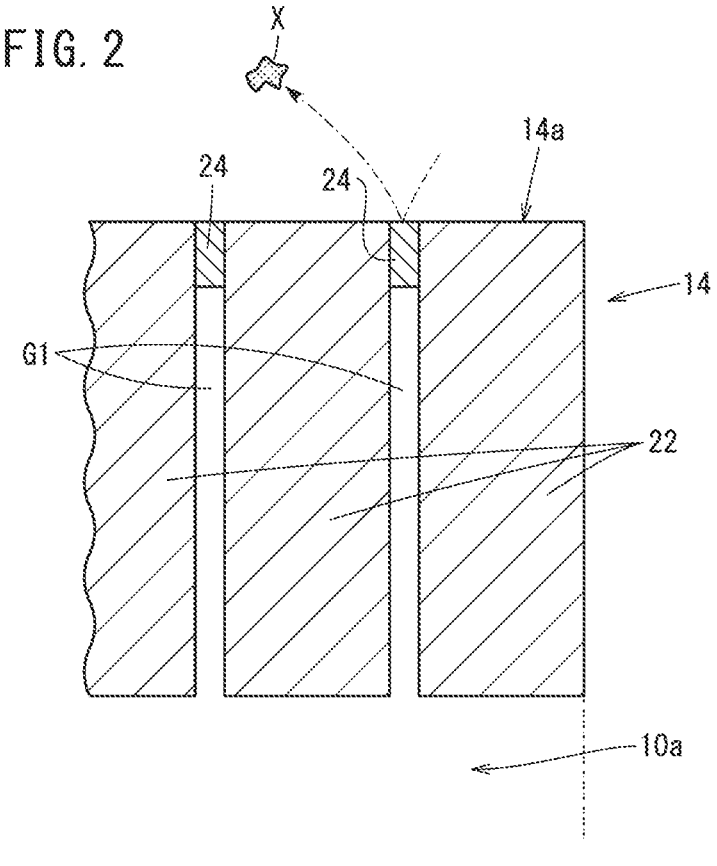
FIG. 2 is an end view taken along line II-II of FIG. 1.

FIG. 2 is an end view taken along line II-II of FIG. 1.

The stator core 14 includes a plurality of electromagnetic steel sheets 22 stacked in the axial direction. Each of the plurality of electromagnetic steel sheets 22 has an annular cross section. The plurality of electromagnetic steel sheets 22 have the same cross-sectional shape. A minute gap G1 arises between the electromagnetic steel sheets 22 adjacent to each other in the axial direction.

A portion of the gap G1 that lies near the outer surface 14a of the stator core 14 is sealed by an impregnating material 24. Thus, foreign material X is prevented from entering the inside 10a of the electric motor 10 from the outer surface 14a through the gap G1. The foreign material X includes, for example, water droplets, oil, dust, and the like.

Each of the two housings 16 has, for example, an end face having an annular shape. The two housings 16 include a first housing 161 and a second housing 162.

The first housing 161 is connected to the first end surface 14b via one of the two gaskets 18. Therefore, the first housing 161 covers the first end surface 14b. Further, the first housing 161 has a plurality of insertion holes 202 extending in the axial direction. The plurality of insertion holes 202 of the first housing 161 are formed to correspond to the plurality of insertion holes 201 of the first end surface 14b.

A connecting member 26 such as a screw is inserted into the corresponding insertion hole 201 and insertion hole 202 via a through hole 38 (described later) formed in the gasket 18. Thus, the first housing 161 is connected to the first end surface 14b.

The second housing 162 also has a plurality of insertion holes 202. However, the plurality of insertion holes 202 of the second housing 162 are formed to correspond to the plurality of insertion holes 201 of the second end surface 14c. The method of connecting the second housing 162 and the second end surface 14c is the same as the method of connecting the first housing 161 and the first end surface 14b. Therefore, the second housing 162 covers the second end surface 14c.

Each of the two gaskets 18 is an annular seal member disposed between the stator core 14 and the housing 16. The description of the gasket 18 disposed between the second housing 162 and the second end surface 14c is basically the same as the description of the gasket 18 disposed between the first housing 161 and the first end surface 14b. Based on this, in order to avoid redundant description, the description of the gasket 18 disposed between the second housing 162 and the second end surface 14c will be omitted below.

Figure 3:
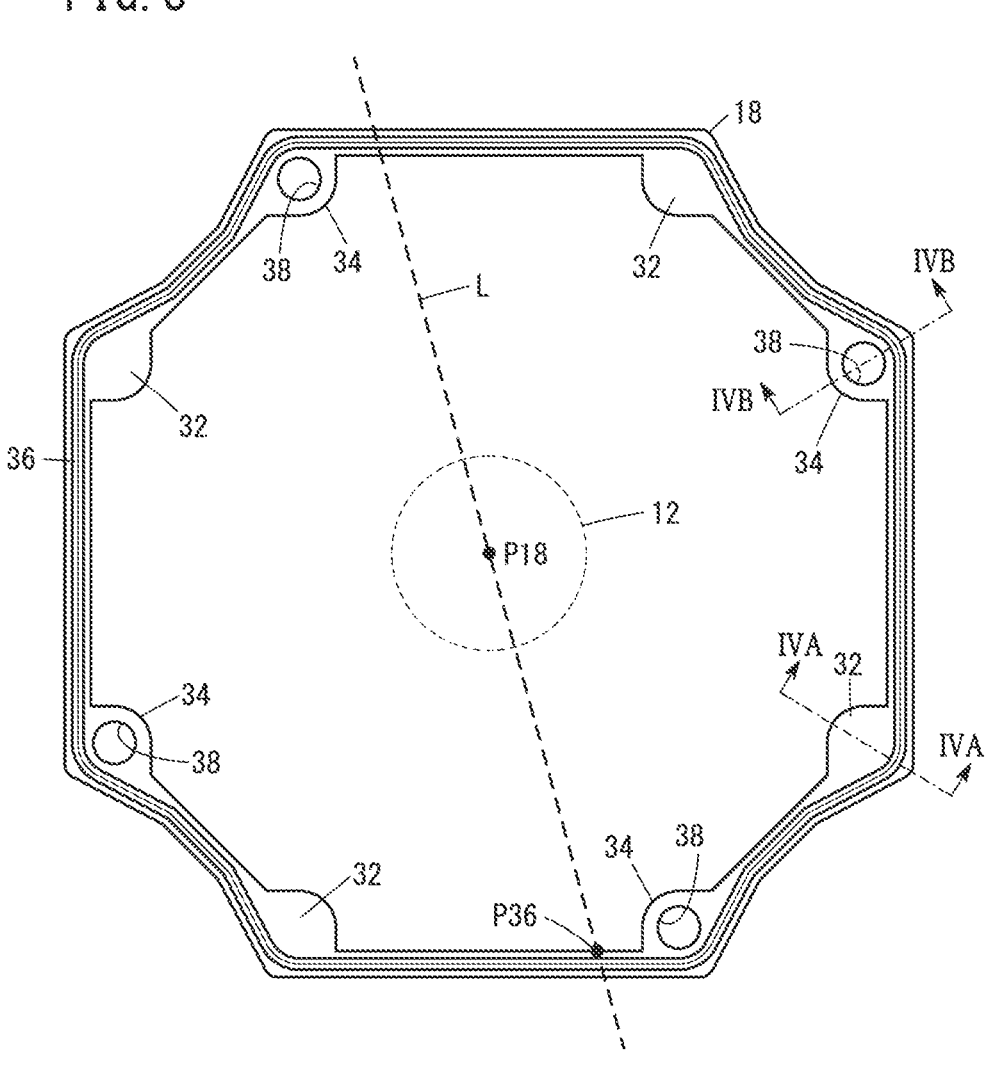
FIG. 3 is a front view of a gasket according to the embodiment.
Figure 4A:
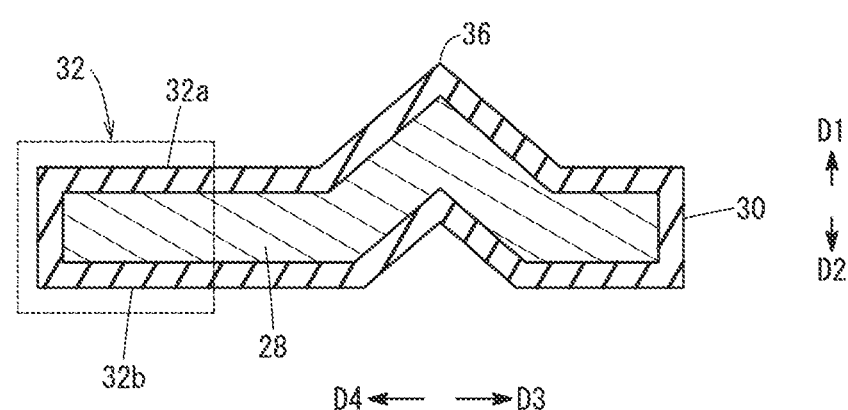
FIG. 4A is an end view taken along line IVA-IVA of FIG. 3.

FIG. 3 is a front view of the gasket 18 according to the embodiment. FIG. 4A is an end view taken along line IVA-IVA of FIG. 3.

An arrow D3 in FIG. 4A indicates a third direction toward the outside of the annular shape of the gasket 18. Further, an arrow D4 indicates a fourth direction toward the inside of the annular shape of the gasket 18.

The gasket 18 is a semi-metallic gasket. That is, the gasket 18 includes a metal material 28 and a resin material 30 that coats the metal material 28. The resin material 30 has elasticity. The resin material 30 that possesses elasticity, for example, is rubber.

Semi-metallic gaskets are less deformable than non-metallic gaskets and are more flexible than metallic gaskets. Further, for example, in the manufacture of an electric motor using a liquid gasket, it is essential to control the amount of the liquid gasket applied to the electric motor. On the other hand, the semi-metallic gasket is easier to handle than the liquid gasket because it is not necessary to control the application (coating) amount.

The gasket 18 includes a plurality of portions to be sucked 32, a plurality of insertion portions 34, and a bead 36.

The plurality of portions to be sucked 32 are provided on lateral portions in the inner side of the gasket 18. However, the plurality of portions to be sucked 32 may be provided on lateral portions in the outer side of the gasket 18. The plurality of portions to be sucked 32 each have a first surface 32a and a second surface 32b. The first surface 32a is a surface, of the portion to be sucked 32, that faces in the first direction. The second surface 32b is a surface, of the portion to be sucked 32, that faces in the second direction. Each of the first surface 32a and the second surface 32b extends in the fourth direction.

Since the gasket 18 includes the plurality of portions to be sucked 32, the first surface 32a or the second surface 32b can be sucked, for example, by a suction hand of a robot. That is, the gasket 18 is preferably designed to have a narrow width, in order to increase the surface pressure that the gasket 18 receives, as much as possible. However, disadvantageously, it is difficult for such a narrow gasket 18 to be grasped by a human hand, held under suction by a suction hand of a robot, or the like. In this regard, the gasket 18 including the plurality of portions to be sucked 32 can be easily held under suction by the suction hand of the robot.

The number of the portions to be sucked 32 provided in the gasket 18 is not particularly limited. However, it is preferable that the gasket 18 includes at least two portions to be sucked 32 disposed so as to sandwich an imaginary straight line L passing through one point P36 on the bead 36 (gasket 18) and a central point P18 of the annular shape of the gasket 18. Thus, the robot can lift up the gasket 18 in a stable state by the suction hand.

Figure 4B:
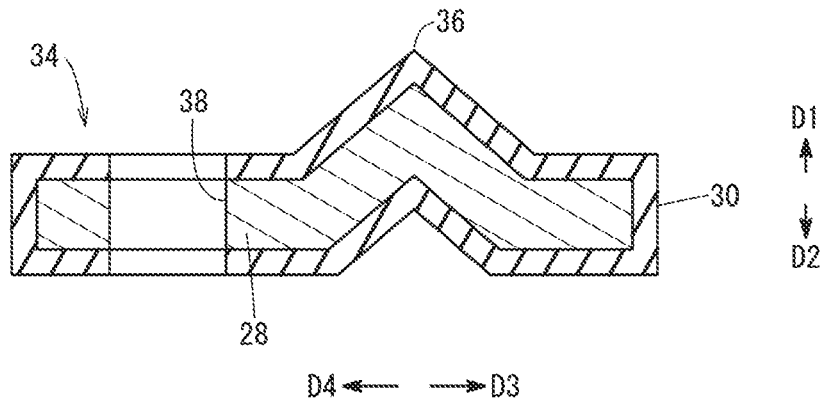
FIG. 4B is an end view taken along line IVB-IVB of FIG. 3.

FIG. 4B is an end view taken along line IVB-IVB of FIG. 3.

Each of the plurality of insertion portions 34 has a through hole 38 penetrating through the gasket 18 in the axial direction. Similarly to the plurality of insertion holes 202 of the first housing 161, the plurality of through holes 38 are arranged to correspond to the plurality of insertion holes 201 of the first end surface 14b. Accordingly, the connecting member 26 inserted into the insertion hole 202 can be further inserted into the insertion hole 201 via the through hole 38.

As described above, the connecting member 26 is, for example, a screw. The stator core 14, the gasket 18, and the first housing 161 are screwed together via a plurality of the connecting members 26. Here, each of the plurality of connecting members 26 applies a strong tightening force to the corresponding insertion portion 34. As a result, the plurality of insertion portions 34 receive a relatively strong surface pressure, compared to the other portions of the gasket 18.

In light of this, it is preferable that the plurality of insertion portions 34 are arranged with point symmetry about the center point P18. Thus, a strong surface pressure can be uniformly applied to the entire gasket 18.

It is preferable that the plurality of insertion portions 34 are arranged at predetermined intervals in the annular shape (circumferential direction) of the gasket 18. Also in this case, a strong surface pressure can be uniformly applied to the entire gasket 18.

The bead 36 is a convex portion formed on the gasket 18 along the circumferential direction of the rotor core 12. The bead 36 protrudes in the first direction. The bead 36 deforms when the first housing 161 is pressed against the gasket 18. Thus, the bead 36 generates a repulsive force against the first housing 161 and the stator core 14. As a result, the gasket 18 is brought into tightly close contact with the first housing 161 and the stator core 14 particularly at the bead 36. As a result, the bead 36 firmly seals a gap between the first end surface 14*b* and the first housing 161. The bead 36 may protrude in the second direction.

In the gasket 18, the bead 36 is formed on the outer side of all the through holes 38 in the radial direction of the rotor core 12. Accordingly, as will be described below, the foreign material X is prevented from entering the inside 10*a* of the electric motor 10 through a gap between the gasket 18 and the stator core 14 or a gap between the gasket 18 and the first housing 161.

Figure 5:
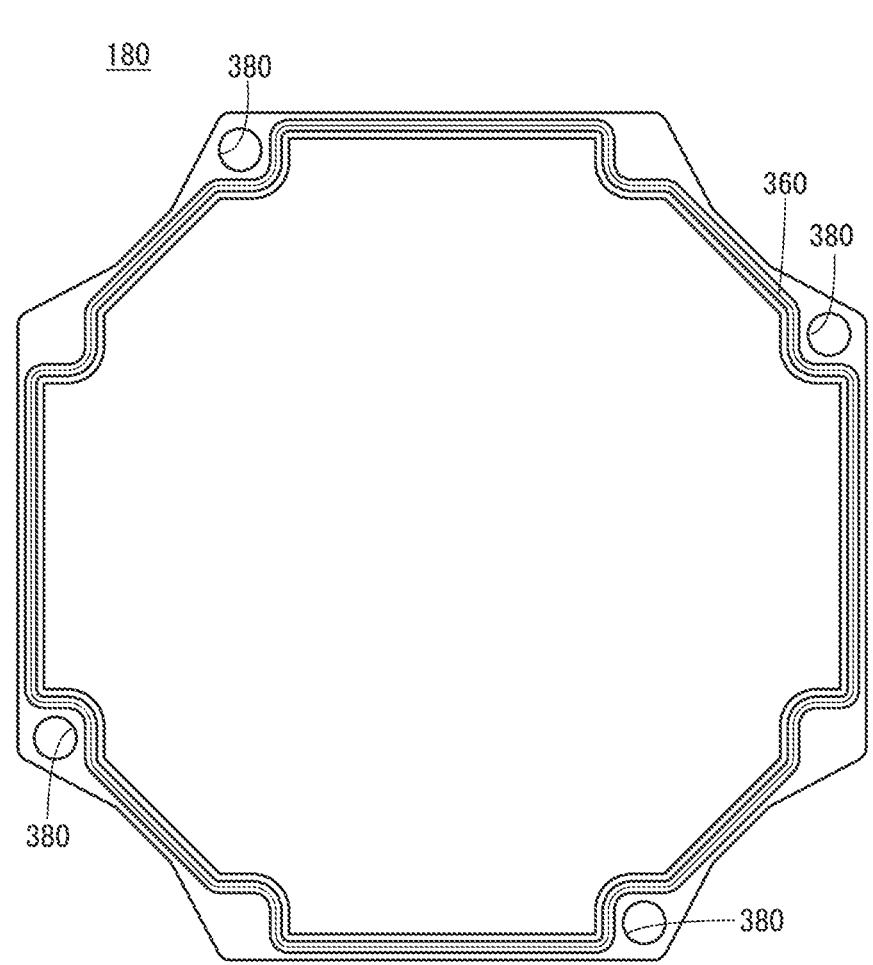
FIG. 5 is a front view of a gasket according to a reference example.

FIG. 5 is a front view of a gasket 180 according to a reference example.

The gasket 180 has a bead 360 and a plurality of through holes 380. The plurality of connecting members 26 are passed through the plurality of through holes 380 to seal a gap between the stator core 14 and the housing 16 (see also FIG. 6). However, the bead 360 is formed inside the through hole 380.

Figure 6:
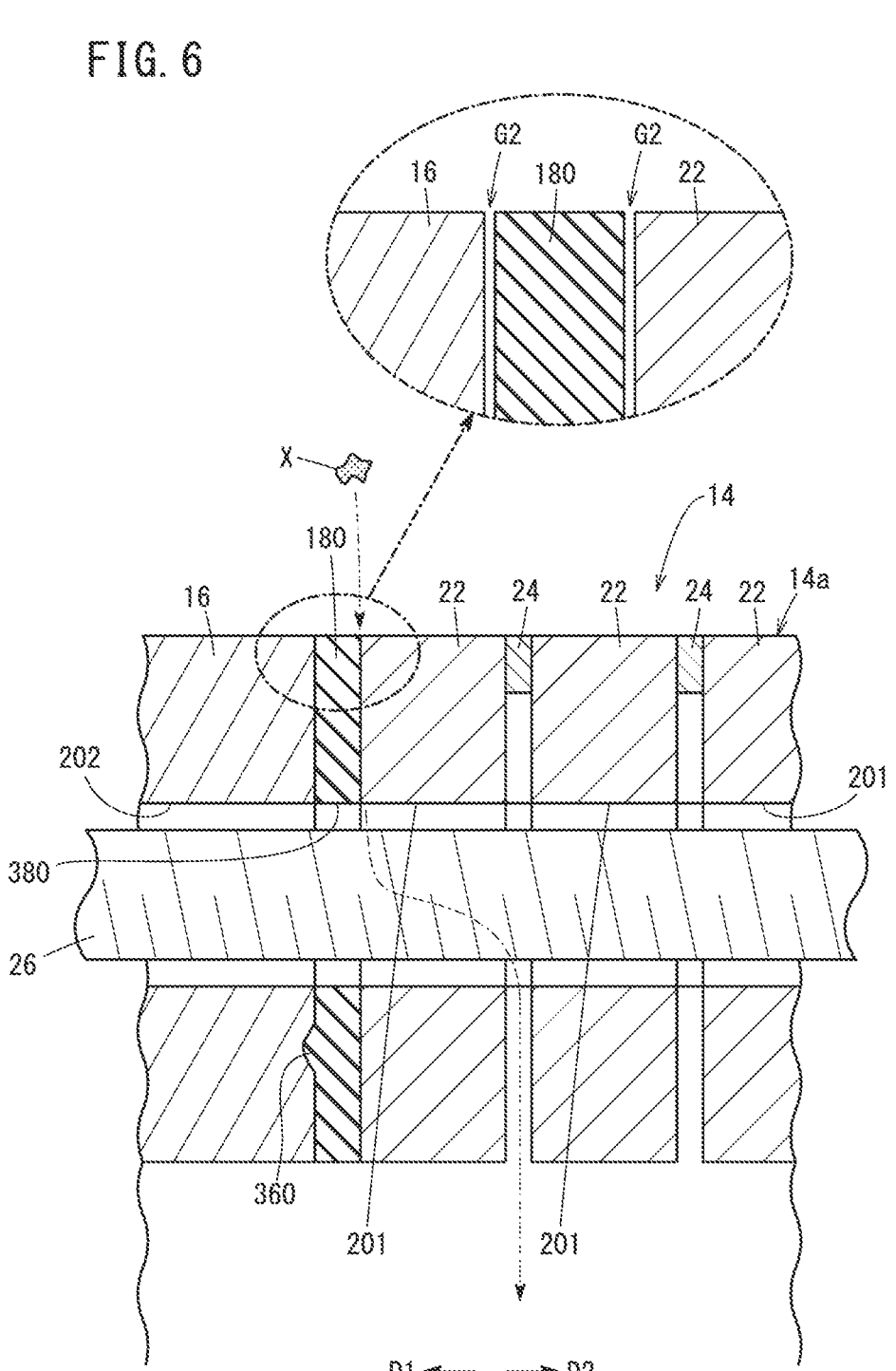
FIG. 6 is a view illustrating an entry path of foreign material in a case where the gasket according to the reference example is provided between a housing and a stator core.

FIG. 6 is a diagram illustrating an entry path of foreign material in a case where the gasket 180 according to the reference example is provided between the housing 16 and the stator core 14.

The bead 360 is present in a portion of the gasket 180 that lies on the radially inward side relative to the through hole 380. Therefore, the portion of the gasket 180 lying on the radially inward side relative to the through hole 380 comes into close contact with the housing 16 and the stator core 14 strongly.

A portion of the gasket 180 that lies on the radially outward side relative to the through hole 380 is also in close contact with the housing 16 and the stator core 14. However, the bead 360 does not exist in the portion of the gasket 180 that lies on the radially outward side relative to the through hole 380.

Therefore, the surface pressure received by the portion of the gasket 180 that lies on the radially outward side relative to the through hole 380 is smaller than the surface pressure received by the portion of the gasket 180 that lies on the radially inward side relative to the through hole 380.

As a result, a minute gap G2 may occur between the gasket 180 and the stator core 14 or between the gasket 180 and the housing 16 on the radially outward side relative to the through hole 380 (see a region enclosed by a chain line in FIG. 6).

Therefore, for example, the foreign material X enters through hole 380 via the gap G2. The foreign material X that has entered the through hole 380 further enters the insertion hole 201 of the stator core 14. The foreign material X that has entered the insertion hole 201 of the stator core 14 enters the radially inner side of the stator core 14 through the gap between the two electromagnetic steel sheets 22. That is, the foreign material X is highly likely to reach the rotor core 12.

In this regard, according to the present embodiment, the bead 36 is formed radially outward relative to the plurality of through holes 38. This prevents communication between the outside of the electric motor 10 and the through holes 38. Therefore, the possibility that the foreign material X enters the inside 10*a* of the electric motor 10 from the outside of the electric motor 10 is reduced.

Modifications

Modifications of the above-described embodiment will be described below. However, explanations that overlap with those of the embodiment will be omitted insofar as possible in the following description. Elements that have already been described in the above embodiments are provided with the same reference numerals as in the above embodiments unless otherwise indicated.

Modification 1

Figure 7:
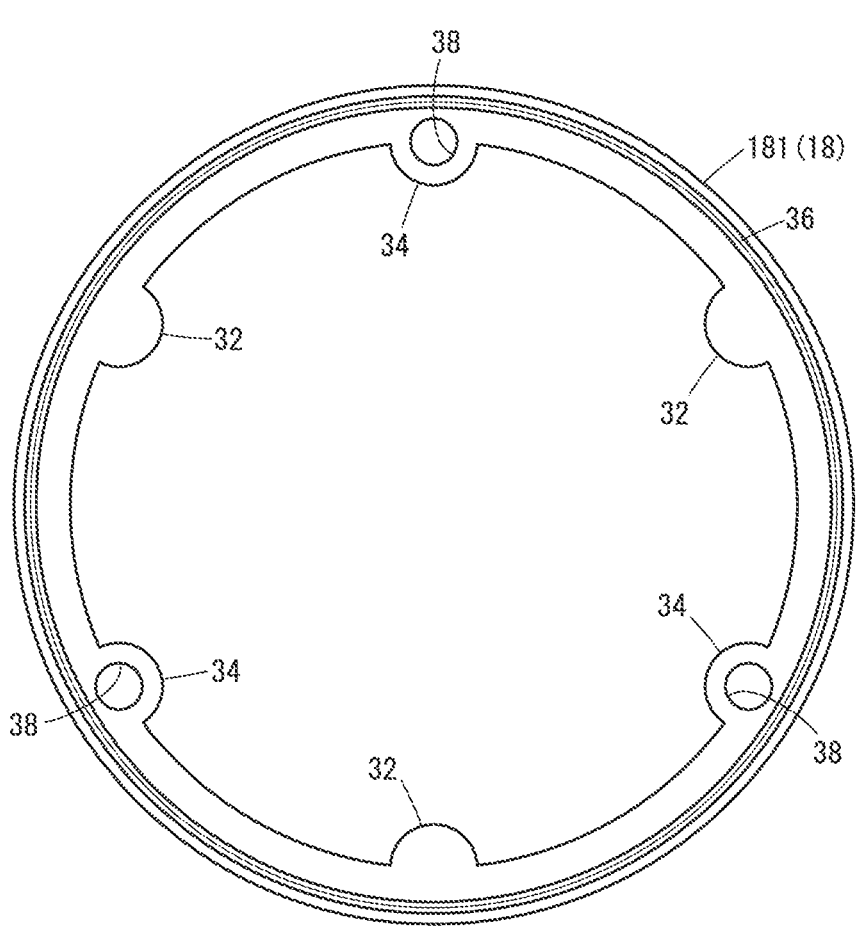
FIG. 7 is a front view of a gasket according to a first modification.
Figure 8:
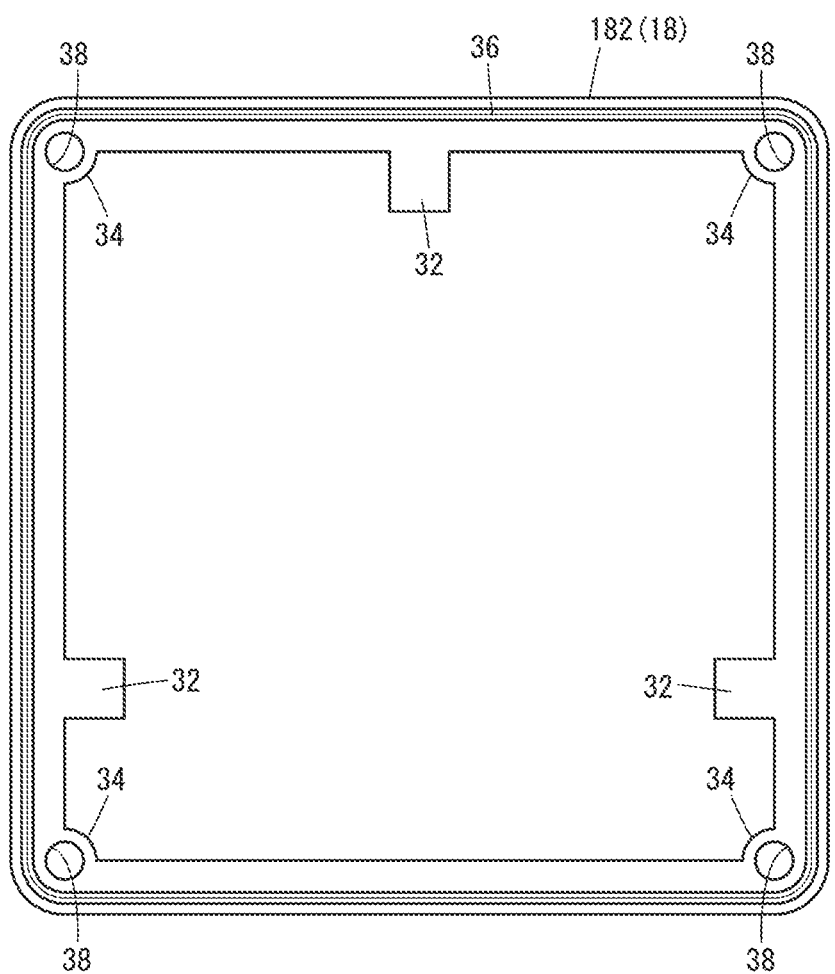
FIG. 8 is a front view of another gasket according to the first modification.

FIG. 7 is a front view of a gasket 181 (18) according to a first modification. FIG. 8 is a front view of another gasket 182 (18) according to the first modification.

The shape of the gasket 18 is not limited to the substantially octagonal annular shape. For example, the end surface of each of the housing 16 and the stator core 14 has a circular annular shape. In this case, the gasket 18 may have a circular annular shape corresponding to each of the end surfaces of the housing 16 and the stator core 14 (FIG. 7).

In addition, for example, each end surface of the housing 16 and the stator core 14 has a substantially quadrangular annular shape. In this case, the gasket 18 may have a substantially quadrangular annular shape corresponding to each of the end surfaces of the housing 16 and the stator core 14 (FIG. 8).

Modification 2

A connector may be connected to the second housing 162. In this case, the gasket 18 may seal a gap between the second housing 162 and the connector.

Further, for example, a bracket may be connected to the second housing 162. In this case, the gasket 18 may seal a gap between the second housing 162 and the bracket.

Modification 3

The gasket 18 is not limited to a semi-metallic gasket.

(Combination of Plurality of Modifications)

The plurality of modifications described above may be appropriately combined as long as no contradiction occurs.

Inventions Capable of Being Obtained from the Embodiment

The inventions that can be grasped from the above-described embodiment and the modifications thereof will be described below.

An invention is characterized by the electric motor (10) equipped with: the rotor core (12); and the stator core (14) covering the outer periphery of the rotor core and including opposite end surfaces (14*b*, 14*c*) in the axial direction of the rotor core, wherein the outer surface (14*a*) of the stator core is exposed, the electric motor including: the housing (16) connected to the opposite end surfaces of the stator core and covering the opposite end surfaces; and the gasket (18) having an annular shape and provided between the stator core and the housing, wherein the stator core includes the plurality of insertion holes (201) into which the plurality of connecting members (26) configured to connect the housing are inserted, the insertion holes being formed along the circumferential direction of the rotor core, and the gasket includes: the plurality of through holes (38) through which the plurality of connecting members penetrate; and the bead (36) having an annular shape and configured to seal a gap between the stator core and the housing, the bead being formed on the outer side relative to the plurality of through holes in the radial direction of the rotor core.

This prevents foreign material from entering the inside of the electric motor through a gap between the stator core, the housing, and the like and the gasket.

The bead may be formed on the outer side relative to all of the through holes in the radial direction. With this configuration, entry of foreign material through a gap between the stator core, the housing, or the like and the gasket is more reliably prevented.

The plurality of through holes may be arranged at predetermined intervals in the circumferential direction. Thus, the surface pressure can be uniformly applied to the entire gasket.

The gasket may be a semi-metallic gasket. With this configuration, it is possible to seal a gap between the stator core and the housing more easily than a liquid gasket or the like.

The gasket may further include a portion to be sucked (32) that protrudes from the bead along the width direction of the bead and that is sucked by the suction hand of the robot. With this configuration, the gasket can be easily lifted up by the suction hand of the robot.

The invention claimed is:

1. An electric motor equipped with: a rotor core; and a stator core covering an outer periphery of the rotor core and including opposite end surfaces in an axial direction of the rotor core, wherein an outer surface of the stator core is exposed, the electric motor comprising:

two housings including:

a first housing being connected to a first end surface which is one of the opposite end surfaces of the stator core and covering the first end surface, and a second housing being connected to a second end surface which is the other of the opposite end surfaces and covering the second end surface; and two gaskets including:

a first gasket having an annular shape and provided between the stator core and the first housing, and a second gasket having an annular shape and provided between the stator core and the second housing, wherein the stator core includes a plurality of insertion holes into which a plurality of connecting members configured to connect the two housings are inserted, the insertion holes being formed along a circumferential direction of the rotor core, and the two gaskets include:

a plurality of through holes through which the plurality of connecting members penetrate; and a bead having an annular shape and configured to seal a gap between the stator core and the two housings, the bead being formed on an outer side relative to the plurality of through holes in a radial direction of the rotor core.

2. The electric motor according to claim 1, wherein the bead is formed on an outer side relative to all of the through holes in the radial direction.

3. The electric motor according to claim 1, wherein the plurality of through holes are arranged at predetermined intervals in the circumferential direction.

4. The electric motor according to claim 1, wherein each of the two gaskets is a semi-metallic gasket.

5. An electric motor equipped with: a rotor core; and a stator core covering an outer periphery of the rotor core and including opposite end surfaces in an axial direction of the rotor core, wherein an outer surface of the stator core is exposed, the electric motor comprising:

a housing connected to each of the opposite end surfaces of the stator core and covering each of the opposite end surfaces; and a gasket having an annular shape and provided between the stator core and the housing, wherein the stator core includes a plurality of insertion holes into which a plurality of connecting members configured to connect the housing are inserted, the insertion holes being formed along a circumferential direction of the rotor core, and the gasket includes:

a plurality of through holes through which the plurality of connecting members penetrate;

a bead having an annular shape and configured to seal a gap between the stator core and the housing, the bead being formed on an outer side relative to the plurality of through holes in a radial direction of the rotor core; and a portion to be sucked that protrudes from the bead along a width direction of the bead and that is sucked by a suction hand of a robot.

* * * * *